United States Patent [19] [11] 3,995,613
Patil [45] Dec. 7, 1976

[54] SOLAR HEAT COLLECTOR UNIT
[75] Inventor: Pandit G. Patil, Pittsburgh, Pa.
[73] Assignee: PPG Industries, Inc., Pittsburgh, Pa.
[22] Filed: Feb. 18, 1975
[21] Appl. No.: 550,507
[52] U.S. Cl. .................................. 126/271; 52/172
[51] Int. Cl.[2] ............................................ F24J 3/02
[58] Field of Search ............ 126/270, 271; 52/172; 237/1 A; 98/88 R, 90; 34/80

[56] References Cited
UNITED STATES PATENTS

| 2,274,492 | 2/1942 | Modine | 126/271 |
|---|---|---|---|
| 2,311,579 | 2/1943 | Scott | 126/271 |
| 3,758,996 | 9/1973 | Bowser | 52/172 |

FOREIGN PATENTS OR APPLICATIONS

| 938,012 | 9/1963 | United Kingdom | 126/271 |

Primary Examiner—Kenneth W. Sprague
Assistant Examiner—James C. Yeung
Attorney, Agent, or Firm—Donald Carl Lepiane

[57] ABSTRACT

A solar heat collector unit includes a solar heat collector having thermal-insulating material, e.g., fiber glass, provided against the outer absorber surface and a protective sheet over the insulating material. A generally U-shaped channel member is provided around the peripheral edges of the collector and protective sheet. The legs of the channel member engage the outer cover plate of the collector and the protective sheet to urge the collector and the protective sheet together about the thermal-insulating material.

8 Claims, 4 Drawing Figures

SOLAR HEAT COLLECTOR UNIT

RELATED APPLICATIONS

The solar heat collectors disclosed in U.S. patent application Ser. No. 450,703 filed on Mar. 13, 1974, in the name of Pandit G. Patil and entitled "Solar Heat Collector"; in U.S. patent application Ser. No. 550,679 filed even date in the names of George H. Bowser, Renato J. Mazzoni and Lester F. Schutrum and entitled "Method of Fabricating A Solar Heat Collector"; and in U.S. patent application Ser. No. 550,680 filed even date in the names of Renato J. Mazzoni and Lester F. Schutrum and entitled "Solar Heat Collector Having A Breather Tube" may be used in the practice of the invention and the teachings therein are hereby incorporated by reference.

BACKGROUND OF THE INVENTION

1. Field of the Invention

This invention relates to a solar heat collector unit.

2. Discussion of the Technical Problems

The advantages of using solar heat collectors to collect solar energy for heating a fluid and/or generating electric power have been recognized in the prior art.

In the prior art, it has been recognized that conduction heat losses of the absorber plate can be minimized by using a thermal-insulating material, e.g., fiber glass. However, the employment of the thermal-insulating material as described in the prior art has limitations. For example, in U.S. patent application Ser. No. 450,703 filed on Mar. 13, 1974, in the name of Pandit G. Patil and entitled "Solar Heat Collector", there is disclosed a solar heat collector surrounded by thermal-insulating material and positioned in an outer case. Any repairs or maintenance to the solar collector can only be made by disassembling the case.

When solar collectors are constructed without a thermal-insulting material about the solar energy absorber, provisions have to be made at the installation site to provide the thermal-insulating material. For example, in certain instances cavities are provided in structures for receiving the solar collector. The cavity is lined with a thermal-insulating material and it is necessary to maintain the thermal-insulating material in position while inserting the collector into the cavity. This requires additional work to mount the insulation in the cavity in such a manner as not to be moved during insertion of the solar collector.

It would be advantageous therefore if a solar collector unit was available that is economic to construct and does not have the limitations of the prior art.

SUMMARY OF THE INVENTION

This invention relates to a solar heat collector unit which includes a solar heat collector of the type having a solar energy absorber and a cover plate mounted in spaced relation to the absorber. Thermal-insulating material, e.g., fiber glass is provided adjacent the outer surface of the absorber. A plate member, e.g., a sheet of galvanized metal is provided against the thermal-insulating material to protect the insulating material from the environment. Facilities, e.g., a U-shaped channel engages the marginal edge portions of the plate member and the cover plate of the collector for urging the collector and the plate member together against the fiber glass.

DESCRIPTION OF THE INVENTION

This invention relates to a solar heat collector unit which includes a solar heat collector and thermal-insulating material mounted at least about the outer surface of the absorber plate of the collector to reduce conduction and/or radiation heat losses.

Figure 1:
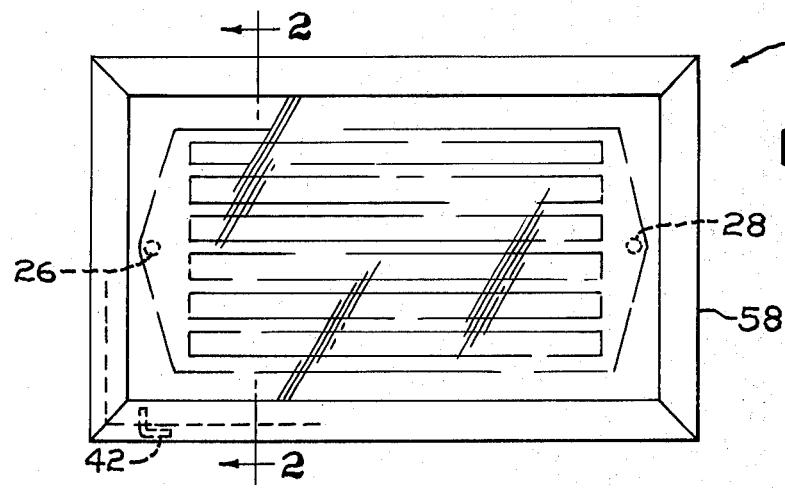
FIG. 1 is a frontal view of a solar heat collector unit constructed in accordance to the teachings of the invention.
Figure 2:
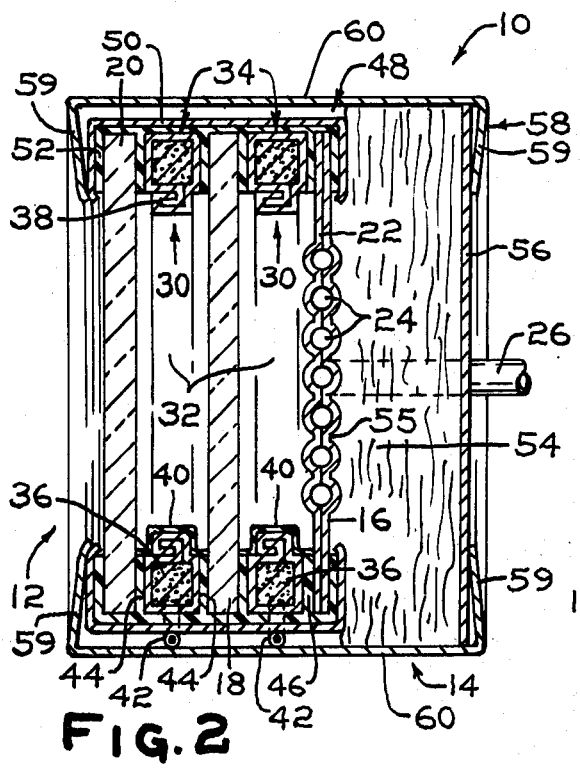
FIG. 2 is a view taken along lines 2—2 of FIG. 1.

As will be appreciated, the actual construction of the solar collector is not limiting to the invention and any design known in the art can be used in the practice of the invention. Referring to FIG. 1, there is shown a solar collector unit 10 incorporating features of the invention. As shown in FIG. 2, the solar collector unit 10 includes a solar collector 12 and a thermal-insulating compartment 14.

For purposes of illustration and not limiting to the invention, the solar collector 12 is of the type disclosed in U.S. patent application Ser. No. 550,680 filed even date in the names of Renato J. Mazzoni and Lester F. Schutrum and entitled "Solar Heat Collector Having a Breather Tube". In general, the collector 12 includes a solar radiation and infrared absorber plate 16, an intermediate cover plate 18, and an outer cover plate 20.

The absorber plate 16 is preferably made of a heat conductive material such as aluminum, steel or copper. Surface 22 of the absorber plate facing the sun is normally treated so as to provide maximum efficiency in absorbing solar radition for subsequent use. For example, the solar radiation may be used to heat a heat absorbing medium moved through conduits 24 provided in the absorber plate 16. The heat absorbing medium, e.g., water or a mixture of water and ethylene glycol is moved into inlet pipe 26 through the conduits 24 and out of the conduits by way of outlet pipe 28.

The intermediate and outer cover plates 18 and 20, respectively, are selected to pass solar radiation through the collector and reduce heat losses due to convection and/or conduction. The cover plates are normally made of glass which may be thermally or chemically tempered.

The absorber plate 16, the intermediate cover plate 18 and the outer cover plate 20 are maintained in spaced relation by spacer assemblies 30. The spacer assemblies (1) maintain the cover plates and absorber plate in spaced relation while providing airspaces 32 therebetween; (2) absorb moisture trapped in the airspaces 32 during fabrication; (3) prevent moisture from moving into the airspaces 32 during use of the solar collector and (4) permit equalization of the air pressure within the airspaces 32 to the ambient air pressure.

Each of the spacer assemblies 30, in general, includes a spacer frame 34 of the type disclosed in the above-mentioned U.S. patent application Ser. No. 550,680 filed even date. The spacer frame 34 (shown in FIG. 3) has a desiccant material 36 therein such as silica gel or molecular sieve. Communication between the airspace and the desiccant material 36 is provided through a plurality of passageways 38 provided in a portion of the spacer surface facing the airspace. The remaining portion of the spacer frame facing the airspace is sealed as by a layer of paint 40 to prevent communication between the desiccant material therein and the air in the airspace. A capillary tube 42 is provided on the outer peripheral surface of the spacer frame to permit the ingress and egress of air from the airspace so as to equalize pressure within the airspace to the ambient air pressure while preventing moisture from moving into the airspace.

Opposed surfaces 44 of the spacer frame 34 are adhered to marginal surfaces of the cover plates and absorber by a moisture-impervious adhesive 46 of the type known in the art. "Moisture-impervious adhesive" as the term is used is adhesive that prevents moisture from moving into the airspace while adhesively bonding the spacer frames, cover plates and absorber together. Types of moisture-impervious adhesives that may be used but not limiting to the invention, are taught in U.S. patent application Ser. No. 550,679 filed even date in the names of George H. Bowser, Renato J. Mazzoni and Lester F. Schutrum and entitled "Method of Fabricating A Solar Heat Collector". The spacer frame 34 and moisture-impervius adhesive 46 provide a primary moisture-impervious seal.

A composite strip 48 including a bendable-formable tape 50, e.g., made of aluminum, having a layer 52 of moisture-impervious adhesive thereon is preferably provided around (1) the peripheral edge portions of the spacer frames 34, cover plates 18 and 20, and absorber plate 16 and (2) the marginal edge portions of the outer cover plate 20 and absorber plate 16 as shown in FIG. 2. The composite strip 48 provides a secondary moisture-impervious seal. As shown in FIG. 2, the breather tube 42 extends through and beyond the composite strip 48.

Referring specifically to FIG. 2, a thermal-insulating material 54, e.g., fiber glass or wool, is provided on the outer surface 55 of the absorber plate. Preferably, the thermal-insulation material is adhered to the outer surface 55 of the absorber by adhesive. A protective sheet 56 is provided over the thermal-insulating material 54 with the inlet and outlet pipes 26 and 28, respectively, extending beyond the sheet 56. The sheet 56 protects the insulating material from the enviroment and may be made of metal, wood or plastic.

A channel member 58 made of metal, e.g., stainless steel, of essentially U-shaped, cross-section extends completely around the perimeter of the solar collector and the protective sheet. Legs 59 and central portion 60 of the channel member 58 form an angle slightly less than 90°. When the channel member 58 is affixed to the perimeter of the collector window and protective sheet, the legs 59 are held apart to permit insertion of the collector and protective sheet. The legs 59 are then released and spring back to contact the marginal edges of the outer cover plate and protective sheet. In this manner, the solar collector 12 and protective sheet 56 are urged together against the thermal-insulating material 54. The channel member 58 generally includes several sections of channeling that are joined or abutted together at their ends.

The invention also contemplates providing thermal-insulating material within the U-shaped channel member to further minimize heat losses.

Figure 4:
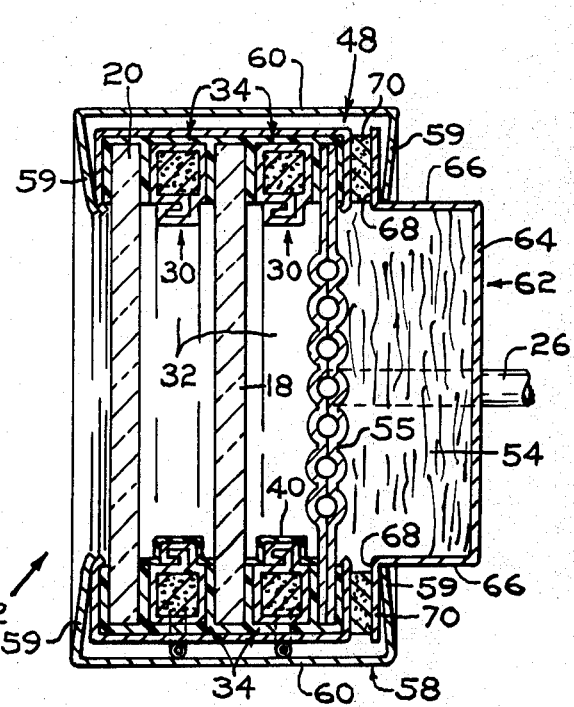
FIG. 4 is a view similar to the view of FIG. 2 showing another embodiment of the invention.

Referring to FIG. 4, there is shown another embodiment of the invention. In FIG. 4, the solar collector 12 is similar to that of FIG. 2. The thermal-insulating material 54 is provided on the outer absorber surface 55 as previously discussed. In the embodiment shown in FIG. 4, a pan 62 is used in place of the protective sheet 56. The pan 62, in general, includes a base 64 and sidewalls 66 (2 shown) integral therewith to provide a receptacle for protecting the thermal-insulating material 54. Flanges 68 integral with the sidewalls 66 are engaged by the legs 59 of the channel member 58 to maintain the pan 62 and collector 12 together about the thermal-insulating material 54.

In the instance where the pan 62 is made of metal, it is recommended that a thermal-insulating material 70 be provided between the flanges 68 of the pan 62 and the surface 55 of the absorber 16 of the solar collector. The thermal-insulating material 70 minimizes conduction heat losses from the absorber to the metal pan. The layer of thermal-insulating material 70 may be plastic, cork, asbestos or fiber glass to name a few.

By practicing the instant invention, there is provided a solar heat collector unit that is (1) economical to construct; (2) easy to repair and (3) easy to install in structures while minimizing heat losses due to convection and/or radiation.

DETAILED DESCRIPTION OF THE INVENTION

The invention will be described to construct a solar heat collector unit in accordance with the teachings of the invention.

The solar heat collector used in the following discussion is of the type disclosed in the above-mentioned U.S. patent application Ser. No. 550,680 filed even date in the names of Renato J. Mazzoni and Lester F. Schutrum. However, as can now be appreciated, the invention is not limited to the construction of the solar heat collector.

Figure 3:
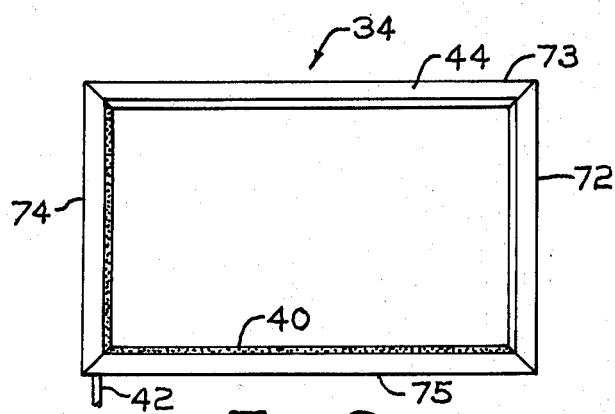
FIG. 3 is a view of a spacer frame that may be used in the construction of the solar heat collector.

With reference to FIGS. 2 and 3, a pair of spacer frames 34 are preferably constructed in the following manner. Four sections 72, 73, 74 and 75 of a lock seam spacer such as the type disclosed in the U.S. Pat. No. 2,684,266 are provided. A desiccant material 36, such as silica gel or molecular sieve, is provided in the spacer sections. The ends of the spacer sections are mitered and joined together in any conventional manner as by welding to provide the frame 34 as shown in FIG. 3 having dimensions of 7 feet (2.1 meters) × 3 feet (0.9 meter) × ½ inch (1.25 centimeters). A capillary tube 42, having an outside diameter of 0.070 inch (0.18 centimeter) and an inside diameter of 0.020 inch (0.05 centimeter) is provided in the outside wall of spacer section 75 adjacent joined ends of spacer sections 74 and 75 and communicating with the desiccant material 32.

The passageways 38 of the spacer sections 74 and 75 are provided with a coating of paint 58 such as the type sold by PPG Industries, Inc., under the trademark DURACRON super 600L/G.

Referring to FIG. 2, a pair of commercial soda-lime-glass sheets 18 and 20 having dimensions of 7 feet (2.1 meters) × 3 feet (0.9 meter) × ⅛ inch (0.32 centimeter) thick are provided. The glass sheets are preferably tempered so as to reduce the probability of breakage during use, e.g., from stones or hail. The glass sheets are cleaned in any conventional manner to remove any foreign particles that may inhibit the passing of solar radiation through the sheets toward absorber 16.

A layer of moisture-impervious adhesive 46 of the type disclosed in the above-mentioned U.S. patent application Ser. No. 550,679 filed even date having a thickness of about 0.015 to 0.020 inch (0.13 to 0.05 centimeter) and a width of less than about 5/16 inch (0.8 centimeter) is extruded onto opposed surfaces 44 of the spacer frames 34.

In accordance to the teachings of the above-identified U.S. patent application Ser. No. 550,679, the spacer frames having the adhesive are heated to remove volatiles in the moisture-impervious adhesive and to drive out any moisture in the desiccant material.

An absorber 16 is provided having a conduit 24. The conduit 24 is connected at one end to an inlet pipe 26 and the other end to an outlet pipe 28 for moving a heat absorbing medium, e.g., water or a mixture of water and ethylene glycol therethrough. The absorber dimensions are about 7 feet (2.1 meters) × 3 feet (0.9 meter) and the pipes have a length of about 5 inches (12.7 centimeters).

Surface 22 of the absorber plate 16 facing the sun is coated with black paint such as the type sold by PPG Industries, Inc., under the trademark DURACRON Super 600L/G and fired at a temperature of 350° F. (177° C.) for 15 to 20 minutes to provide the absrober with a surface having an absorptivity coefficient for solar radiation in a wavelength of 0.3 to 2.1 microns and an emissivity coefficient for infrared energy in the wavelength of 2 to 20 microns of about 0.95.

The absorber 16 is positioned on a rigid surface with the surface 22 facing upward. A spacer frame 30 having the moisture-impervious adhesive on opposed outer surfaces is positioned on the absorber with marginal edges aligned. The intermediate glass sheet 18 is positioned on top of the spacer frame in the same manner. Thereafter, in like manner, a second spacer frame 30 is positioned on the intermediate glass sheet 18 followed by the outer glass sheet 20.

The adhesive 46 between the spacer frame, glass sheets 18 and 20 and the absorber 16 is flowed under a pressure of between about 2 to 10 pounds per square inch (0.14 – 0.7 kilograms per square centimeter) in any conventional manner to form a primary moisture-impervious seal.

Thereafter a composite strip 48 is provided. The strip includes a 1¾ inch (4.4 centimeters) wide aluminum tape 50 having a thickness of 0.010 inch (0.03 centimeter). A layer of moisture-resistant adhesive 52 is provided on one surface in any conventional manner. The adhesive 52 is similar to the adhesive 46. The strip 48 is applied, in any conventional manner, (1) to the peripheral edges of the absorber, glass sheets and spacer frame and (2) bent over the marginal edge portions of the outer glass sheet and the absorber to provide a secondary moisture-impervious seal with the tube 42 extended beyond the tape 50. The strip 48 extends completely around the perimeter of the collector with the ends overlapping.

The tube 42 is bent toward the tape 50 of the composite strip 48 and a covering is preferably provided over the tube 42 to prevent extremely large particles of dust from moving into the tube which could clog the tube. The covering may be a piece of aluminum or a felt pad inserted into the end of the tube.

Referring to FIG. 2, a layer 54 of fiber glass 7 feet (2.1 meters) × 3 feet (0.9 meter) and 3 inches (7.6 centimeters) thick is adhesively bonded to outer surface 55 of the absorber 16. A sheet 56 of galvanized steel, 7 feet (2.1 meters) × 3 feet (0.9 meter) and 1/16 inch (0.16 centimeter) thick having holes therein for receiving the inlet and outlet pipes 26 and 28, respectively, is positioned over the fiber glass.

A channel member 58 of essentially U-shaped cross-section is provided. The channel member 58 is made of steel about ⅛ inch (0.32 centimeter) thick. Legs 59 of the channel member are about 1½ inches (4.3 centimeters) high and the central portion 60 is about 5 inches (0.217 centimeters) wide. The legs 59 and central portion 60 form an angle slightly less than 90°. The legs 59 are held apart to permit insertion of the collector window 12, fiber glass 54 and protective sheet 56. The legs 59 are then released and spring back to contact marginal edge portions of the outer glass sheet 20 and protective sheet 56. In this manner, the collector and protective sheet are urged together about the fiber glass.

Referring now to FIG. 4, the discussion will be directed to an alternate type of solar collector unit constructed in accordance to the teachings of the invention. A pan having a base 64, sidewalls 66 and flanges 68 made of galvanized steel 1/16 inch (0.16 centimeter) thick is provided. The inside dimensions of the base 64 are approximately 6 feet 10½ inches (2.09 meters) × 2 feet 10½ inches (0.89 meters). The height of the sidewalls is approximately 3 inches (7.6 centimeters). The flanges 68 extend outward from the sidewalls 66 about 1½ inches (1.27 centimeters). A ⅛ inch (0.32 centimeter) thick asbestos tape 70 is provided on the extensions 68. A layer of fiber glass 54 having a thickness of about 3 inches (7.6 centimeters) is provided in the pan 52. The pan 52 is held against the outer absorber surface 55 with the fiber glass adjacent thereto by the U-shaped channel 48 as shown in FIG. 4.

Although the invention is described in the above examples, it can be appreciated that the invention is not limited thereto and modification can be made to the examples within the scope of the invention.

What is claimed is:

1. In combination with a solar heat collector of the type having a cover plate for passing solar energy mounted in spaced relation to a solar energy absorber to provide an airspace therebetween, the peripheral edges and outer marginal edges of the cover plate and absorber define a subassembly, comprising:
   a layer of thermal insulating material having a first surface and a second surface opposite to the first surface, the first surface of said layer contacting the outer surface of the absorber;
   a member contacting the second surface of said thermal insulating material said member having peripheral dimensions similar to the peripheral dimensions of the absorber; and
   U-shaped channel means having outer legs spring biased toward each other mounting the peripheral edge portions of said subassembly and said member with a one of the outer legs engaging the marginal edge portions of said cover plate and the other one of said legs engaging the outer marginal edge portions of said member for urging the subassembly and said member together about said layer of thermal insulating material.

2. The solar heat collector unit as set forth in claim 1 further including:
   means for absorbing moisture from the airspace and means for preventing the ingress of moisture into the airspace.

3. The solar heat collector unit as set forth in claim 1 wherein said member is a sheet of metal.

4. The solar heat collector unit as set forth in claim 1 wherein said member is a formed member having a base and sidewalls to form a compartment for encompassing said thermal-insulating material and flanges extending outward from said sides wherein said flanges are engaged by said spring biasing means.

5. The solar heat collector unit as set forth in claim 1 wherein said member is made of metal and further includes a thermal-insulating member between said flanges of said member and said absorber.

6. The solar heat collector window as set forth in claim 5 wherein said thermal-insulating member is asbestos.

7. The solar heat collector unit as set forth in claim 1 wherein said thermal-insulating material is fiber glass.

8. The solar heat collector unit as set forth in claim 1 further including:
   said solar collector further including:
      a second cover plate for passing solar radiation;
      a second means mounted between said cover plate and said second cover plate for maintaining said cover plates in spaced relationship to each other while providing an air space therebetween; and
      means for preventing the ingress of moisture into the air space; and
   said U-shaped channel means engaging marginal edge portions of said member and said second cover plate.

* * * * *